Jan. 31, 1933.  W. LA HODNY  1,895,578
COMBINED MIRROR AND INSTRUMENT
Filed April 30, 1930   3 Sheets-Sheet 1
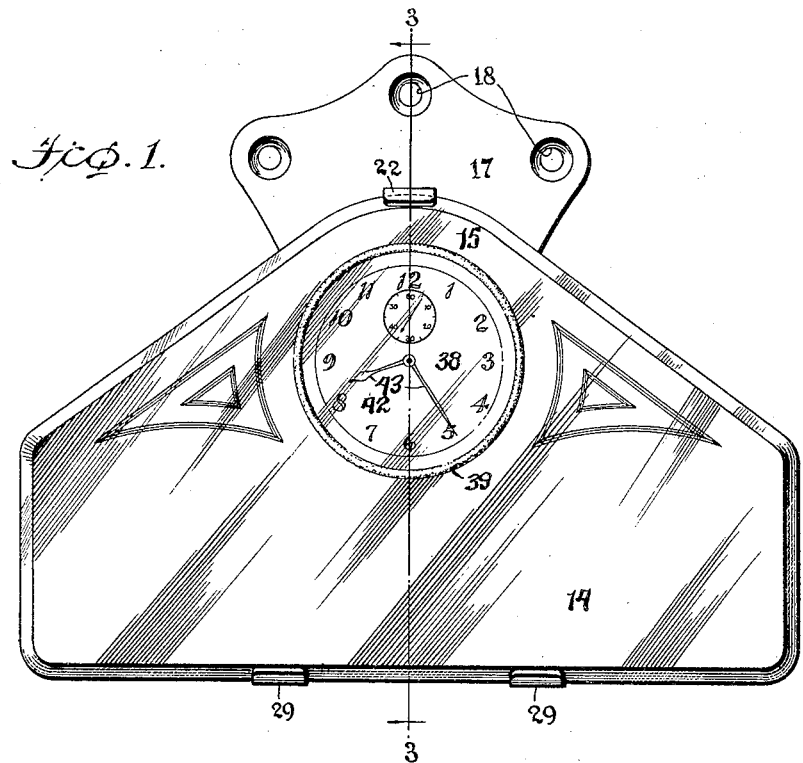
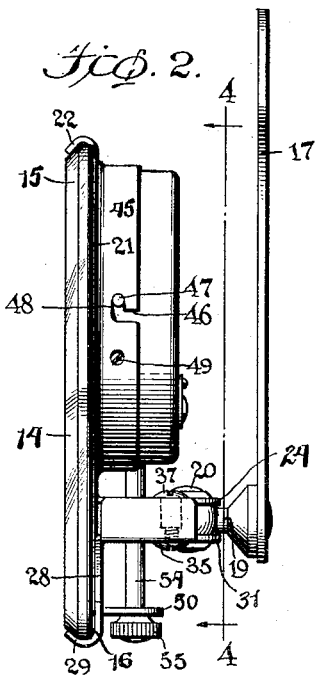
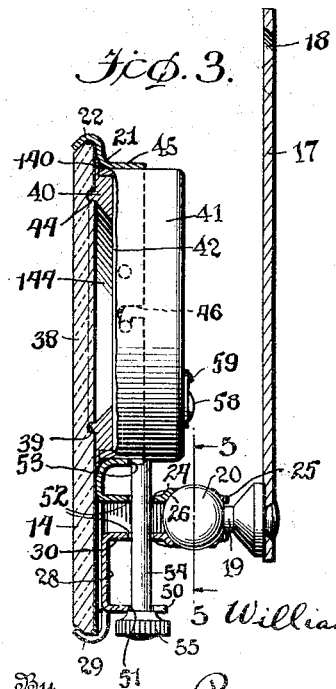
Inventor
William La Hodny
By Popp and Powers
Attorneys Jan. 31, 1933.     W. LA HODNY     1,895,578
COMBINED MIRROR AND INSTRUMENT
Filed April 30, 1930     3 Sheets-Sheet 2
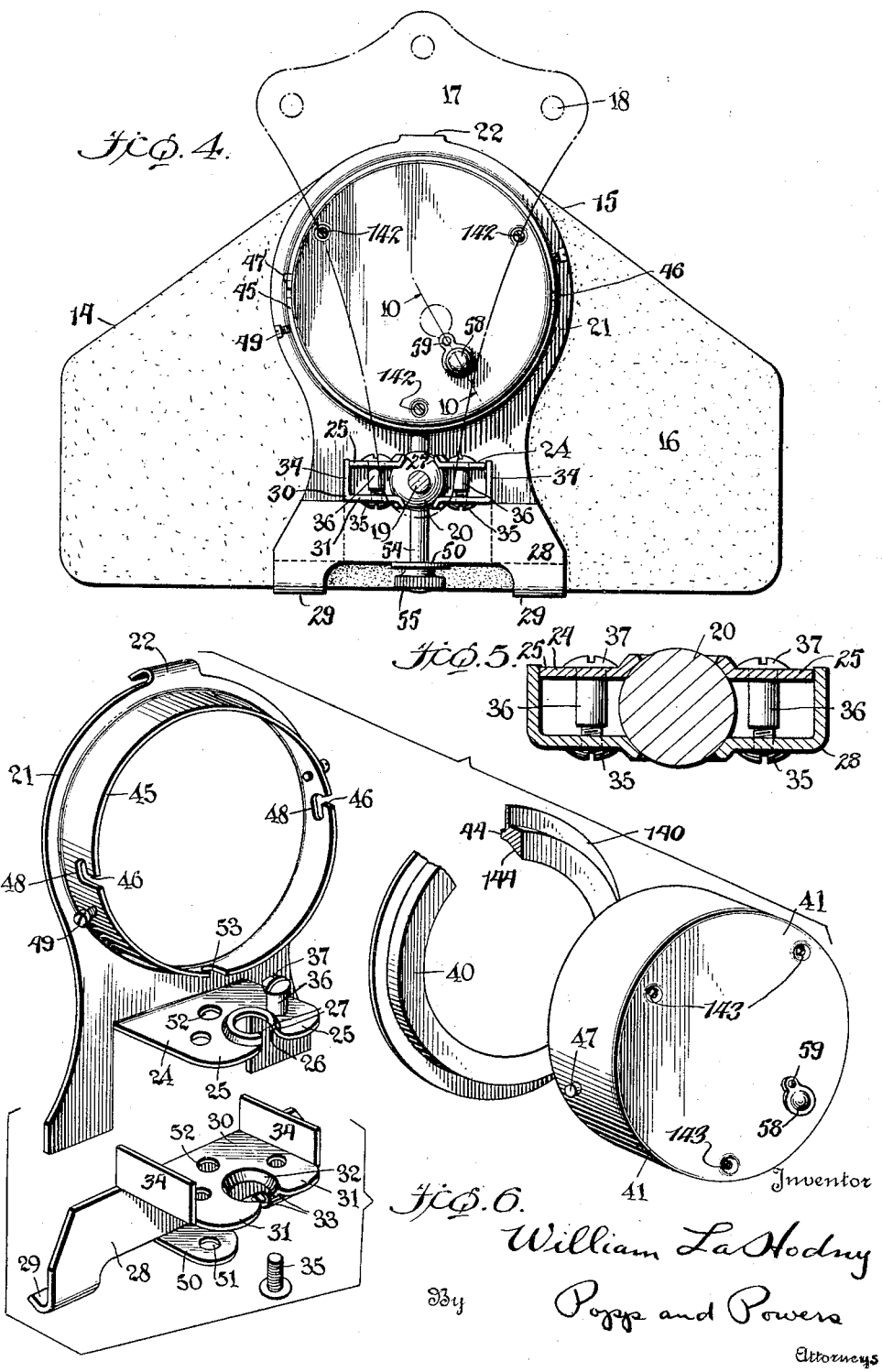

Jan. 31, 1933.                W. LA HODNY                 1,895,578
                      COMBINED MIRROR AND INSTRUMENT
                  Filed April 30, 1930         3 Sheets-Sheet 3

Inventor
William La Hodny
By Popp and Powers
Attorneys

Patented Jan. 31, 1933

1,895,578

UNITED STATES PATENT OFFICE

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK

COMBINED MIRROR AND INSTRUMENT

Application filed April 30, 1930. Serial No. 448,484.

This invention relates to a combined mirror and instrument and is shown as embodied in a rear vision mirror having associated therewith a watch or clock although any instrument can be substituted for the watch or clock, such as a barometer, a compass, a thermometer, a viscosimeter, or any other kind of instrument, to which frequent reference is made in an automobile.

This invention is more particularly directed to the form of a rear vision mirror and clock combination shown and described in the application of William La Hodny, Serial No. 408,095, filed November 18, 1929, in which form the face of the watch or clock is directly visible through a transparent opening or crystal provided in the mirror by removing or eliminating the reflective coating on a portion of the mirror so that the mirror plate itself forms a crystal for the watch or clock. By this means the combined mirror and watch or clock are in their most compact form, the assembly is attractive in appearance, the face of the watch or clock is clearly visible, and the rear vision mirror possesses its complete strength so that it is not likely to break or crack as would be the case if an opening of the size required were provided in the mirror plate. By forming the mirror so as also to form the crystal for a watch or clock, the danger of dust filtering through to the movement is reduced. It will be apparent, however, that the invention can also be employed in connection with a mirror having a transparent opening provided by cutting a disk or piece from the mirror, instead of with a mirror made as described in the said copending application, although the latter form is distinctly advantageous.

One of the principal objects of this invention is to provide a rear vision mirror which is supported by one or more mirror backing plates, which plate is formed to provide a rim or pocket into which the watch or clock case and its contained movement is set, and fastening means for holding the watchcase in this rim, which means permit the watch or clock case to be readily removed in its entirety from the rim when it is desired to make repairs upon the same. By the provision of such a supporting rim and securing means, the watch or clock case is held firmly against the rear side of the mirror plate and in line with the crystal therein, and the watch or clock can be readily removed without in any way affecting the mounting for the rear vision mirror.

A further object is to provide such a combined mirror and instrument in which the mirror is mounted for universal movement relative to its attaching bracket and in which the rim which carries the watch or clock case is supported directly over the universal connection. By this means the watch or clock is supported at the place where it is least subject to vibration, particularly as compared with mounting it at one end of the mirror.

A further object is to provide attaching means for holding the watch or clock case against the rear side of a rear vision mirror from a rim formed in the supporting plate for the mirror plate, which means are adjustable and hold the watch case against the mirror with any desired pressure so that variations in the thickness of the glass mirror plates or other variable conditions can be compensated for.

A further purpose is to so mount the rear vision mirror and clock by means of a universal connection that the rear vision mirror can be swung downwardly to a horizontal position. By so mounting the mirror and watch or clock the mirror can be swung into a horizontal position for convenience in winding, adjusting or removing the watch or clock.

Further objects are to provide such a mirror which is inexpensive in construction and can be produced and sold at low cost and in which the fastening means are not only arranged in a most convenient and accessible manner but also so arranged as to provide a combined rear vision mirror and watch or clock which is attractive in appearance both from the front side and from the rear side thereof and which is, of course, visible through the automobile windshield.

In the accompanying drawings:

Fig. 1 is a front elevation of one form of a combined rear vision mirror and watch or clock embodying my invention.

Fig. 2 is a side elevation thereof.

Fig. 3 is a vertical section taken on line 3—3, Fig. 1.

Fig. 4 is a vertical section taken on line 4—4, Fig. 2.

Fig. 5 is a vertical section taken on line 5—5, Fig. 3.

Fig. 6 is an exploded view of the two backing plates which support the mirror, the watch case, and associated parts.

Similar reference numerals refer to similar parts in each of the several views.

Figure 7:
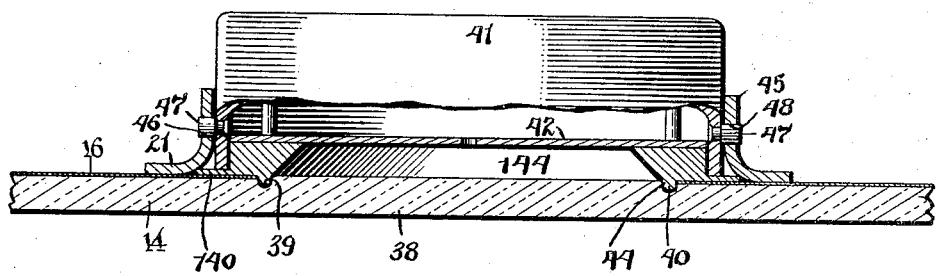
Fig. 7 is a horizontal section through the mirror plate and showing the manner in which the watch case is secured in position.

In its general organization this invention comprises a rear vision mirror for use in automobiles or the like in which a portion of the mirror coating is removed or eliminated to provide a transparent crystal for a watch or clock and a groove in the rear side of said mirror surrounding said crystal, a fixed arm or bracket adapted to be secured to the head bar of an automobile windshield or the like and carrying a ball, a pair of mirror backing plates which are arranged against the rear side of the mirror plate and clamp the mirror plate therebetween and which are also formed to provide jointly an adjustable socket for receiving the said ball so that the mirror can be swung to horizontal or vertical positions and also swung in a horizontal plane, and a watch case supported in a rim formed in one of said mirror backing plates and in rear of said transparency and against said mirror plate by means of fastenings which permit the watch case to be held with any desired pressure against the mirror plate and it also permits the watch case to be removed in its entirety rearwardly from said supporting rim. The watch case is also supported by a ring which forms a marginal reflector for the dial or face of the watch or clock and also is provided with a bead which fits into the groove in said mirror plate and holds the watch case in proper relation to the crystal.

In the form of the invention shown in Figs. 1–7 and 10, the mirror plate 14 is shown as of elongated rectangular form and is provided with an upwardly extended and suitably rounded part 15. This mirror is provided on its rear face with a reflective coating 16 which can be the usual metallic silver deposit or can be any of a large number of reflective coatings which also absorb a part of the light reflected into them so that the mirror reflects the image with reduced illumination but without distortion and a non-glare effect is thereby obtained without sacrificing the clearness of vision.

Both the mirror and the watch or clock, which latter can be either of the back wind, or stem-wind type, are carried by a bracket 17 having holes 18 by which the bracket plate is secured to the head bar (not shown) of the automobile windshield or to any other suitable part of the automobile or other vehicle in which the rear vision mirror is installed.

At its lower end the bracket plate 17 carries a stem 19 which is formed to provide a ball 20. The mirror plate is carried in part by a metal backing plate 21, this backing plate 21 resting flatwise against the rear or coated side of the mirror plate 14 and being formed at its upper end to provide a curved forwardly projecting finger 22. This finger 22 is arranged to engage the bevelled edge of the mirror 14 at the upper end of its rounded portion 15 and serves in part to hold the mirror plate in position. The mirror backing plate 21 is formed at its lower end to provide a rearwardly projecting central jaw 24, this jaw being formed by bending back a part of this mirror backing plate 21, as best shown in Fig. 3. This jaw 24 is bifurcated to provide two rearward extensions 25 and the jaw 24 is formed to provide between these extensions 25 a downwardly facing rounded seat 26 which is adapted to engage and seat upon the upper side of the ball 20. The smallest space between the extensions 25 of the jaw 24, as indicated at 27 is of greater width than the stem 19 carrying the ball 20 so that if desired the mirror can be swung into a position in which the stem is arranged between the extensions 25.

To clamp the mirror in position a lower outer mirror backing plate 28 is provided, this lower mirror backing plate being arranged flat against the rear side of the mirror backing plate 21, as best shown in Fig. 3, and being formed at its lower end to provide one or more fingers 29, which fingers extend around the lower margin of the mirror plate 14 and engage the lower bevelled edge thereof. The lower or outer mirror backing plate 28 is formed to provide a lower jaw 30 at its upper end, which lower jaw, in the same manner as the jaw 24 of the upper mirror plate, is formed by bending back the upper end of the lower mirror backing plate 28 and is also bifurcated to provide two rearward extensions 31 which extensions are formed to provide a rounded seat 32 for engaging the underside of the ball 20. In the same manner as with the upper jaw 24, the smallest space, indicated at 33, between the extensions 31 of the jaw, is larger than the pin 19 which supports the ball 20 so that the mirror can be swung downwardly into a horizontal position, the pin or stem 19 traveling between the extensions 31 of the lower jaw 30. In addition the lower jaw 30 is formed at its sides to provide upwardly extending flanges 34 which flanges engage the sides of the upper jaw 24 and prevent relative twisting movement of these jaws. The relative downward movement of the upper mirror backing plate 21 and upward movement of the lower backing plate 28 to effect clamping of the mirror plate 14 between the fingers 22 and 29 of these plates and the movement of the jaws 24 and 30 toward one another to effect a firm frictional engagement of the seats 26 and 32 thereof against the opposite sides of the ball 20 is effected by three screws 35 which extend through the clamping jaws 24 and 30 on three sides of the ball 20 and upon being tightened force these jaws toward each other and into firm engagement with the ball 20 and at the same time draw the fingers 22 and 29 into firm clamping engagement with the corresponding edges of the mirror plate 14. Each of these screws 35 preferably screws into a sleeve nut 36 which is provided with a slotted head 37 so that either the nut or the screw can be tightened to secure the clamping of the jaws 24 and 30 to the ball 20. By reason of the ball and socket connection formed by the jaws 24 and 30 of the mirror plates and the ball 20 carried by the bracket plate 17 it is apparent that the mirror plate 14 can be grasped and can be moved to any desired position on the ball 20 and by reason of its frictional connection with this ball it is held in such adjusted position without being affected by the vibration of the automobile.

In the upwardly extended part 15 of the mirror plate 14 a transparency 38 is provided. This transparency or opening is provided either by scraping a portion of the metallic deposit or other reflective coating from the rear side of the glass mirror plate or by covering that part with some substance on which the silver or other reflective coating will not deposit. Around this transparency or transparent opening 38 a groove 39 is shown as ground into the rear side of the mirror plate and this groove holds the instrument case in proper relation to the crystal. This instrument case 41 houses the working parts of the watch, clock or other instrument and the dial 42 and hands 43, or other indicating parts of the watch, clock or other instrument are visible through the transparency or crystal 38 formed as previously described. The watch movement is held in position in the watch or clock case by three screws 142 which extend through three marginal holes 143 at the rear of the watch or clock case and screw into the frame of the watch or clock movement in any usual and well known manner.

The connection between the watch case 41 and the rear side of the mirror plate 14 which holds the watch or clock case and its container movement in position includes a separate ring 40 which is formed to provide a forwardly extending bead 44 and laterally extending flange 140 and a beveled inwardly facing face 144. This ring 40 is placed against the rear side of the mirror plate 14 and its bead 44 is fitted into the groove 39 in the mirror plate, the flange 140 being arranged against the rear side of the mirror plate. The rim of the instrument case 41 fits over the ring 40 and against the flange 140, and is thereby held in proper relation to the crystal, the ring being so positioned by the bead 44 in the groove 39. The inclined or beveled face 144 forms a reflective rim or margin for the dial 40 of the watch or clock, this beveled reflective margin tending, in appearance, to bring the dial forward. The watch or clock movement is not, however, in any way supported by this ring, but the movement including the dial, is exclusively supported by the screws 142.

The upper or outer metal mirror backing plate 21 is formed to provide a rearwardly projecting annular rim 45 which is open on its rear side and into which the watch case 41 fits. This rim 45 is formed on its opposite sides to provide a pair of cooperating bayonet grooves 46. These bayonet grooves receive a pair of pins 47 provided upon opposite sides of the watch case 41, the watch case being inserted in the rim 45 so that its pins 47 engage the bayonet slots 46 and upon being thereafter turned clockwise is locked in the vertically extending part 48 of the bayonet groove 46 in the usual manner. This vertically extending part 48 of each bayonet groove preferably inclines toward the mirror plate 14 so that this turning movement of the watch or clock case 41 serves to tighten the watch case 41 against its rim 40 and serves to tighten the rim 40 in its groove 39, thereby holding these parts in firm engagement with one another and preventing the entrance of dust into the watch case and also holding the same firmly against vibration or rattling. To hold this watch or clock case 41 in its proper position in the rim 45 a set screw 49 is provided, which set screw 49 is arranged in one side of the rim 45 and screws into the adjacent side of the watch or clock case 41 so as to prevent unscrewing and loss thereof.

The watch or clock movement can be wound in any suitable manner. As shown, the lower edge of the lower or outer mirror backing plate 28 is formed to provide a rearwardly extending ear 50 having a hole 51 and the clamping jaws 30 and 24 are each provided with holes 52 arranged directly over the hole 51. Above the holes 51 and 52 the rim 45 for the watch case is also notched, as indicated at 53. In these holes 51 and 52 and the notch 53 is received a sleeve 54 which is connected with the lower side of the watch or clock case 41. This sleeve 54 carries a shaft to the lower end of which a winding crown 55 is secured. The one end of the winding shaft which is turned by the winding crown 55 is connected in any usual and well known manner with the watch or clock movement (not shown) which forms no part of the present invention.

Figure 10:
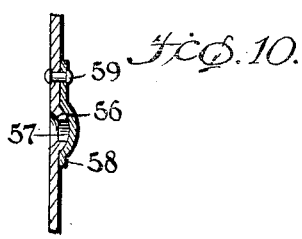
Fig. 10 is a section taken on line 10—10, Fig. 4.

For the purpose of adjusting the watch or clock mechanism, a teat 56 is provided in the rear side of the watch or clock case 41 and a hole 57 is formed in this teat, through which hole access to the watch or clock movement can be obtained for adjusting the same. This opening 57 is normally closed by a closure 58 which, as shown in Fig. 10, is pivoted by means of a rivet 59 to swing along the rear face of the watch or clock case 41 and is dished upwardly to spring over the teat 56 so as to be held in its closed position and prevent the entrance of dust through the opening 57.

It is apparent that by providing a sufficient space between the extensions 31 of the lower clamping jaw 30 the entire assembly can be swung downwardly so that the mirror plate 14 is arranged horizontally. In this position the back of the instrument case 41 is readily accessible for winding or adjusting the watch or clock and it is also apparent that while in this horizontal position the set screw 49 can be readily loosened and the entire instrument case 41 removed from its rim 45. By this means should it become necessary to repair the watch or clock it can be quickly removed from the rear vision mirror without in anyway disturbing the mounting for the mirror itself, and hence the watch or clock can be taken out and left for repairs and adjustment without in any way interfering with the operation or mounting of the rear vision mirror.

Figure 8:
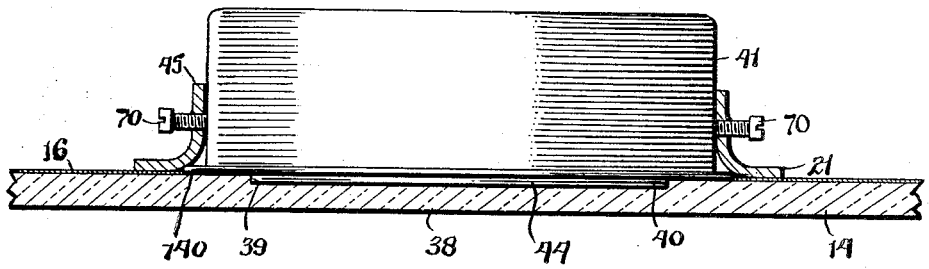
Fig. 8 is a view similar to Fig. 7 showing a modified form of the means for securing the watch case in its supporting rim.

In Fig. 8 is illustrated a modified form of the present invention. In this form instead of the provision of the bayonet slots and pins for supporting the watch or clock case 41 the watch or clock case is supported by two or more set screws 70 which are screwed into opposite sides of the rim 45 and bear against opposite sides of the watch or clock case 41. It is apparent that in this form the watch or clock case is set into the rim 45 and is held against the mirror plate 14 at the desired pressure and is then locked in place by tightening the set screw 70 against the sides of the watch or clock case.

Figure 9:
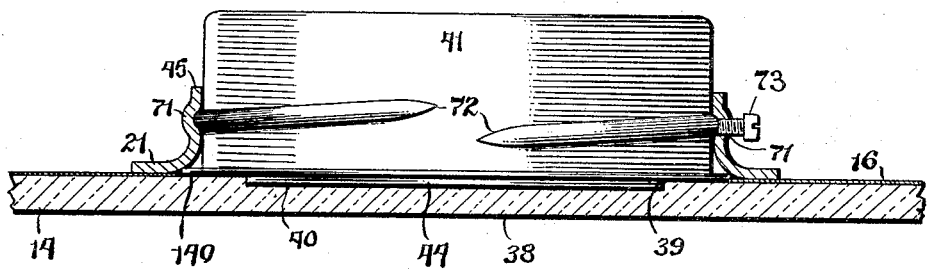
Fig. 9 is a view similar to Figs. 7 and 8 showing a still further modified form of the means for securing the watch case within its supporting rim.

In Fig. 9 is illustrated another modified form of the present invention. In this form, instead of the provision of the bayonet slots and pins in the form of the invention shown in Figs. 1–7 and 10, female threads 71 are formed in the rim 45, which threads 71 receive male threads 72 formed in the sides of the watch or clock case 41. It is apparent that in this form the watch or clock case is screwed into the rim 45 and into firm engagement against the mirror plate 14. To hold the watch or clock case in this adjusted position a set screw 73 is provided which set screw is mounted in one side of the rim 45 and screws against the adjacent side of the watch or clock case 41 so that upon being tightened this set screw holds the watch or clock case against unscrewing.

While in all of the forms of the present invention the rim 45 has been shown as formed in the upper plate 21 it is apparent that the entire assembly could be inverted, or this rim provided in the lower plate 28 so that the watch or clock is arranged at the lower center of the mirror 14 instead of in the upper center, as shown.

All of the forms of the present invention provide a simple and secure means for supporting an instrument case, such as for a watch or clock, against the rear side of a rear vision mirror and in each of the forms the instrument case with its contained movement is securely held by a fixed rim which completely surrounds the instrument case and supports the instrument case in a position directly over the ball and socket connection between the mirror plate and its supporting bracket in which position the watch or clock movement is subject to the least vibration. A simple and inexpensive means are also provided for retaining the instrument case in any adjusted position within its supporting rim and also permit the watch or clock case to be removed rearwardly from its supporting rim, thereby avoiding the necessity of loosening or removing any parts of the mirror supporting means in removing the watch or clock case for repairs or adjustment of its movement. The mounting of the mirror plate further permits the rear vision mirror to be swung to a horizontal position in which the rear of the instrument case is readily accessible for repairs or adjustment, thereby rendering the repair, adjustment or removal of the watch or clock movement convenient.

In all of its forms, this invention also provides a combined rear vision mirror and watch or clock which is attractive in appearance, both from its front and rear sides and can be produced at low cost.

I claim as my invention:

1. Means for supporting an instrument case behind a transparent panel comprising a panel supporting plate having an opening therein and having a rim surrounding said opening, means for supporting said panel in front of said rim, said panel having in its rear face an indentation adjacent said rim, said case being fitted in said rim from the side thereof remote from said panel, and means fitting in said indentation and holding said instrument case in proper position relative to said panel whereby an instrument arranged in said instrument case is visible through said panel.

2. Means for supporting an instrument case behind a transparent panel comprising a panel supporting plate having an opening therein and having a rim surrounding said opening, means for supporting said panel in front of said rim, said panel having in its rear side an indentation surrounding said opening, said case being fitted in said rim from the side thereof remote from said panel, means fitting in said indentation and holding said instrument case in proper position relative to said panel and means for removably holding said instrument case in said rim whereby an instrument arranged in said instrument case is visible through said panel.

3. In combination with a transparent panel having an annular groove in its rear face, an open sided instrument case arranged in rear of said panel, a ring interposed between said instrument case and panel and fitted into the rim of said instrument case and also bearing against the rear face of said panel, said ring also being formed to provide a forward projection which fits into said groove, and means for holding the instrument case against the ring and for holding the ring against the rear side of said panel, whereby an instrument arranged in said instrument case is visible through said panel.

4. In combination with a transparent panel, an open sided instrument case arranged in rear of said panel, a ring interposed between said instrument case and panel and fitted to the rim of said instrument case and also bearing against the rear face of said panel, said ring also being formed to provide a forwardly projecting bead which fits into a groove provided in the rear face of said panel, means for holding the instrument case against the ring and for holding the ring against the rear side of said panel, whereby an instrument arranged in said instrument case is visible through said panel.

5. In combination with a transparent panel, at least one metal backing plate adapted to receive and hold said panel and also formed to provide an open sided rim projecting away from said panel and forming an opening through said plate, said panel having formed in its rear side a groove which is symmetrically located within said rim, a time piece case fitted in said rim from the side thereof remote from said panel, whereby a time piece movement arranged in said case and including a dial is visible through said panel, a ring interposed between said case and panel and including a forwardly projecting bead fitting in said groove and a laterally outward projecting flange fitting between said backing plate and said panel, the portion of said ring fitting in said case being bevelled to provide a reflective margin for said dial and means for removably holding said case in a fixed position in said rim and against said ring and for holding said ring in proper position against said panel.

6. Means for supporting an instrument case behind a transparent panel comprising a panel supporting plate having an opening therein and having a rim surrounding said opening, means for supporting said panel in front of said rim, said panel having in its rear face an indentation adjacent said rim, said case being fitted in said rim from the side thereof remote from said panel whereby an instrument arranged in said instrument case is visible through said panel, means fitting in said indentation and holding said instrument case in proper position relative to said panel and a set screw connection between said rim and case.

7. Means for supporting an instrument case behind a transparent panel comprising a panel supporting plate having an opening therein and having a rim surrounding said opening, means for supporting said panel in front of said rim, said panel having in its rear face an indentation adjacent said rim, said case being fitted in said rim from the side thereof remote from said panel whereby an instrument arranged in said instrument case is visible through said panel, means fitting in said indentation and holding said instrument case in proper position relative to said panel and a bayonet slot and pin connection between said rim and case.

8. Means for supporting an instrument case behind a transparent panel comprising a panel supporting plate having an opening therein and having a rim surrounding said opening, means for supporting said panel in front of said rim, said panel having in its rear face an indentation adjacent said rim, said case being fitted in said rim from the side thereof remote from said panel whereby an instrument arranged in said instrument case is visible through said panel, means fitting in said indentation and holding said instrument case in proper position relative to said panel and a screw connection between said rim and case comprising internal threads provided in said rim and external threads provided on said case.

9. Means for mounting an instrument case behind a transparent panel, comprising a panel supporting plate having an opening therein and having a tubular rim surrounding said opening, means for supporting said panel in front of said rim, said case being fitted in said rim from the side thereof remote from said panel whereby an instrument arranged in said instrument case is visible through said panel, and means for securing said case in said rim and including wedge means holding said case firmly against the face of said panel.

10. Means for mounting an instrument case behind a transparent panel, comprising a panel supporting plate having an opening therein and having a tubular rim surrounding said opening, means for supporting said panel in front of said rim, said case being fitted in said rim from the side thereof remote from said panel, a separate bezel ring loosely fitted in said rim between said case and panel, and means connecting said case and rim and holding said case firmly against the ring for holding the ring against the rear side of said panel whereby an instrument arranged in said instrument case is visible through said panel.

11. Means for mounting an instrument case behind a transparent panel, comprising a panel supporting plate having an opening therein and having a tubular rim surrounding said opening, means for supporting said panel in front of said rim, said case being fitted in said rim from the side thereof remote from said panel, a separate bezel ring loosely fitted in said rim between said case and panel, and wedge means connecting said case and rim and holding said case firmly against the ring for holding the ring against the rear side of said panel whereby an instrument arranged in said instrument case is visible through said panel.

In testimony whereof I hereby affix my signature.

WILLIAM LA HODNY.